Figure 1:
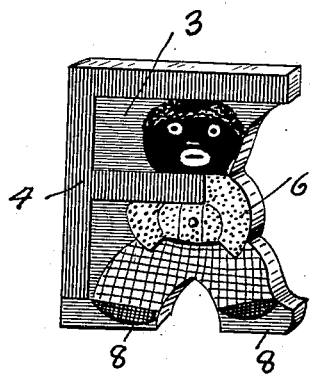

C. A. McLAIN AND E. M. BOTHNE.
EDUCATIONAL BLOCK.
APPLICATION FILED NOV. 3, 1920.

1,377,261.

Patented May 10, 1921.

Inventors
CHARLES A. McLAIN
ESTHER A. BOTHNE
By their Attorney

UNITED STATES PATENT OFFICE.

CHARLES A. McLAIN AND ESTHER M. BOTHNE, OF MINNEAPOLIS, MINNESOTA.

EDUCATIONAL BLOCK.

1,377,261.   Specification of Letters Patent.   Patented May 10, 1921.

Application filed November 3, 1920. Serial No. 421,611.

*To all whom it may concern:*

Be it known that we, CHARLES A. McLAIN and ESTHER M. BOTHNE, citizens of the United States, residing at Minneapolis, in the county of Hennepin and State of Minnesota, have invented certain new and useful Improvements in Educational Blocks; and we do hereby declare the following to be a full, clear, and exact description of the invention, such as will enable others skilled in the art to which it appertains to make and use the same.

Our invention has for its object to provide a novel set of educational blocks, and to such ends, the invention consists of the novel construction and arrangement of parts hereinafter described and defined in the claim.

Each block is formed and marked to represent an animate object and one of the letters of the alphabet, and a complete set of these blocks should include all of the letters in the alphabet. For the purposes of this case, only two such blocks are illustrated and the blocks represent the letters F and J, having been alphabetically selected for representation.

Very few of the letters of the alphabet, even when represented on thick blocks, will stand upright on a flat surface if cut on the outline of a letter. Moreover, blank letters are not very interesting to small children. To add interest to the different letter-representing blocks, each block is not only marked to represent an alphabetical character, but is marked and cut out to represent an animate object, preferably a human being, and the represented object is formed with feet having flat bottoms that adapt the block to be stood upright on a floor, table or other horizontal surface.

It is highly important to note that, in accordance with this invention, the alphabetical characters form a material and usually a greater part of the marginal outline of the complete block, so that each block is given its own peculiar shape or character not only by the letter that it represents and the figure thereon, but by the entire marginal outline of the block. This is very important because it helps the child to distinguish between the blocks in three different ways, to-wit: by the letter, by the figure and by the general outline.

In the accompanying drawings, which illustrate the invention, like characters indicate like parts throughout the several views.

Figure 2:

Referring to the drawings:

Figure 1 is a perspective showing a character block representing the letter F; and Fig. 2 is a similar view representing the character J.

In both of the views, the block 3 is preferably made from a piece of wood of proper thickness, say about one-quarter of an inch. This block, in Fig. 1, is marked at 4 to represent the character F, while in Fig. 2, it is marked at 5 to represent the character J. In Fig. 1, the character 6 is cut and marked to represent a negro boy, while in Fig. 2, the block is cut and marked to represent a typically Dutch boy 7. In both blocks, the characters are provided with feet 8 which have flat bottoms located below the lowermost portions of the letter characters and adapted to rest on a flat surface and support the block in an upright or upstanding position, as already stated.

Blocks of this kind will be very interesting to children. It will amuse them to assemble the letters to spell words and then to see what sort of an assembly of characters the spelled word brings together. The blocks can, therefore, be used as a sort of an instructive educational game.

What we claim is:

An educational block formed and marked to represent an object and an alphabetical character, the represented object having feet with flat bottoms that are adapted to support the block in an upright position, and said alphabetical character forming a material part of the marginal outline of the block.

In testimony whereof we affix our signatures.

CHARLES A. McLAIN.
ESTHER M. BOTHNE.